Dec. 4, 1951 H. A. BRECHEISEN 2,577,645
NUT CRACKER WITH RECIPROCATING JAW
Filed Nov. 3, 1949

INVENTOR.
Henry A. Brecheisen
BY
ATTORNEY.

Patented Dec. 4, 1951

2,577,645

UNITED STATES PATENT OFFICE 2,577,645

NUTCRACKER WITH RECIPROCATING JAW

Henry A. Brecheisen, Baldwin, Kans.

Application November 3, 1949, Serial No. 125,236

3 Claims. (Cl. 146—16)

This invention relates to nut crackers, the primary object being to provide a manually operable device capable of exerting a relatively great amount of pressure upon the nut in such manner as to effectively crack the same quickly and easily and expose the meats without damage thereto.

It is the most important object of this invention to provide a nut cracker having a pair of relatively shiftable jaws between which the nut is cracked, there being manually operable structure for shifting one of the jaws rapidly against the nut, and having parts capable of being placed in use after the nut is held in position to be cracked for slowly moving the shiftable jaw against the nut with great force.

Another important object of the present invention is the provision of a nut cracker having a fixed jaw and a reciprocable jaw, the latter being provided with a swingable arm for actuating the same and a mutilated gear on the arm movable to and from a position in mesh with a toothed rack, all to the end that the arm and the shiftable jaw may be swung freely when the gear is in one position and shifted slowly and with force when the gear is brought into mesh with the aforesaid rack.

Other objects including those relating to details of construction, will be made clear or become apparent during the course of the following specification, reference being had to the accompanying drawing, wherein.

Figure 1:
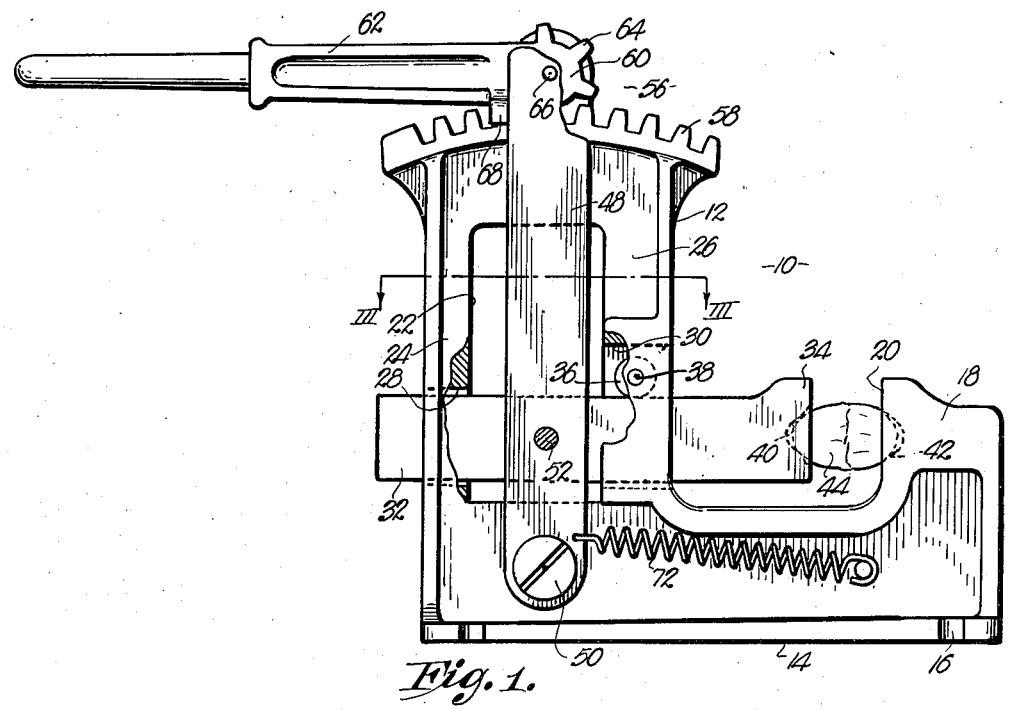
Fig. 1 is a side elevational view of a nut cracker made in accordance with the present invention, parts being broken away for clearness.
Figure 2:
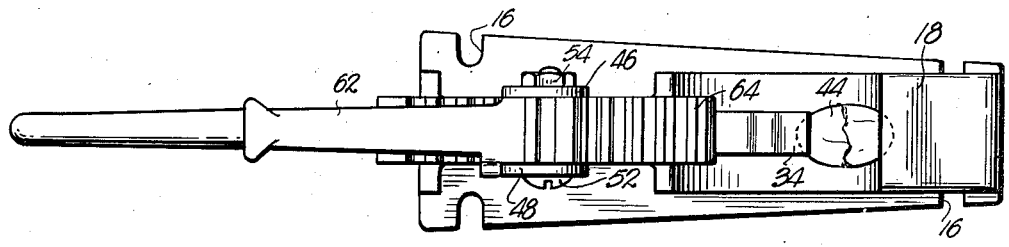
Fig. 2 is a top plan view thereof.
Figure 3:
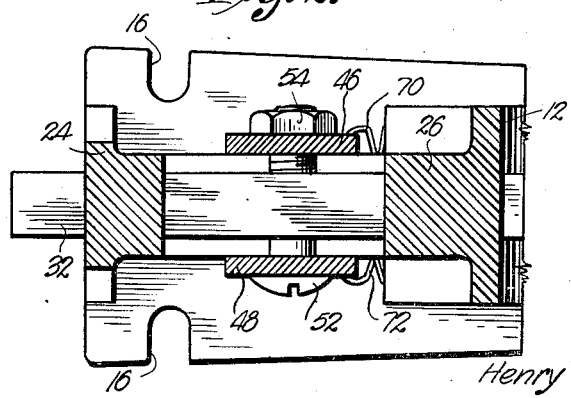
Fig. 3 is a transverse, cross-sectional view taken on line III—III of Fig. 1, looking in the direction of the arrows.

This invention contemplates the production of a relatively small, portable nut cracker adaptable when placed in use, of permitting the cracking of a relatively large number of nuts quickly and easily.

As will hereinafter appear, the force that is exerted upon the nuts to be cracked, is relatively great, irrespective of the fact that the overall construction is relatively small. There is provided a substantially L-shaped frame, broadly designated by the numeral 10, having a vertical leg 12 and a substantially horizontal leg 14 that is provided with a plurality of opposed slots 16 for receiving screws, bolts or other fastening means and permitting the rigid attachment of the entire nut cracker to a solid base.

Both legs 12 and 14 are substantially H-shaped in cross-section and the leg 14 is provided with an upwardly extending, fixed jaw 18 having an innermost face 20 spaced from and substantially parallel with the proximal vertical edge of the leg 12 of frame 10.

An elongated, substantially centrally, disposed vertical slot 22 is formed in the leg 12 presenting a pair of opposed vertical parallel sections 24 and 26. Sections 24 and 26 are provided with aligned openings 28 and 30 respectively for reciprocably receiving an elongated bar 32 provided with a jaw 34 on the innermost end thereof. It is noted that the longitudinal axis of the bar 32 is substantially horizontal when the same is mounted within the openings 28 and 30. The width of the openings 28 and 30 is substantially the same as the width of the bar 32, but as is illustrated in Fig. 1 of the drawing. The height of opening 30 is appreciably greater than the width of the bar 32 and a roller 36 within the opening 30 overlies the uppermost longitudinal edge of the bar 32 and is mounted for free rotation upon a transverse shaft 38 mounted in the section 26 of leg 12. The horizontal axis of rotation of the roller 36 is substantially perpendicular to the path of travel of the bar 32 and the distance between the roller 36 and the lowermost end of opening 30 is slightly greater than the width of the bar 32.

The innermost face of the jaw 34 is substantially parallel with the face 20 of jaw 18 and frusto-conical openings 40 and 42 are formed in the jaws 34 and 18 respectively for receiving a nut 44 to be cracked.

A pair of substantially parallel, elongated, vertical arms 46 and 48, are mounted on the opposite faces of the leg 12 and pivotally secured to the leg 14 of frame 10 through the medium of a transverse bolt 50 having a nut on one end thereof adjacent the arm 46 (not shown). The arms 46 and 48 are also pivotally joined with the bar 32 within the slot 22 of leg 12 by means of a bolt 52 having a nut 54.

The distance between the upper and lower edges of opening 28 and the distance between roller 36 and the lower edge of opening 30 are each greater than the width of bar 32 to provide free movement thereof as bolt 52 travels along an arc concentric with bolt 50.

The arms 46 and 48 extend upwardly beyond an elongated, arcuate rack 56 on the uppermost end of the leg 12, rack 56 being provided with a plurality of teeth 58.

A mutilated gear 60, formed integrally with a handle 62, is provided with a plurality of teeth 64. Gear 60 is rotatably secured between the arms 46 and 48 by means of a horizontal shaft 66 that is substantially parallel with the bolts 50 and 52. Gear 60 is spaced above the rack 56 when the handle 62 is in the position illustrated in Fig. 1 of the drawing, to permit free swinging movement of the arms 46 and 48 on the pivotal point 50. The extent of swinging movement of the handle 62 in one direction for releasing teeth 64 with respect to teeth 58, is limited by a stop 68 on the handle 62 disposed to contact the arm 48.

Springs 70 and 72, joining arms 46 and 48 respectively, adjacent bolt 50, are secured to the leg 14 of frame 10 subjacent to the bolt 50 for yieldably holding the arms 46 and 48 biased toward the jaw 18.

In use, the handle 62 is moved to the position illustrated in Fig. 1 of the drawing, to release teeth 64 and 58, thereby permitting free manual swinging movement of the handle 62, gear 60 and arms 46 and 48. Jaw 34 is moved away from the jaw 18 against the action of the spring 70 and 72 and the nut 44 is placed in position within the cavity 42 of jaw 18.

The bar 32 and its jaw 34 is thereupon permitted to move toward the jaw 18 until the cavity 40 receives the proximal end of nut 44. Handle 62 is thereupon raised to rotate the gear 60 which moves the teeth 64 into meshing relationship with teeth 58. Continued swinging movement of the handle 62 to move the stop 68 away from the arm 48, progressively swings the arms 46 and 48 toward the jaw 18. Such swinging movement is imparted to the bar 32 to shift the same and the jaw 34 thereon against nut 44 until the latter is cracked. As handle 62 is swung back to the position shown in Fig. 1 and thereupon pulled to move the jaw 34 away from the nut 44, the latter may be removed from the cracker for subsequent salvage of the meats thereof.

It is noted that the major axis of the oval nut 44 is disposed for cracking in a horizontal plane since it has been found that more efficient cracking of nuts is thereby accomplished, since the meats are released without damage thereto.

Details of construction differing from those herein disclosed and above described, may be of course, varied to suit the desires of the manufacturer without departing from the spirit of this invention as defined by the scope of the appended claims.

Having thus described the invention, what is claimed as new and desired to be secured by Letters Patent is:

1. A nut cracker comprising a frame; a stationary jaw on said frame; a jaw carried by the frame for movement toward and away from said stationary jaw; an elongated, toothed rack on the frame; a toothed gear in mesh with the teeth of said rack and rotatable along the rack; and at least one arm pivotally joined to said gear, to said frame and to said movable jaw for moving the latter as the gear moves on the rack.

2. A nut cracker comprising a frame; a stationary jaw on said frame; a jaw carried by the frame for movement toward and away from said stationary jaw; an elongated, toothed rack on the frame; a toothed gear in mesh with the teeth of said rack and rotatable along the rack; at least one arm pivotally joined to said gear, to said frame and to said movable jaw for moving the latter as the gear moves on the rack; and means interconnecting the arm and the frame for yieldably holding the arm and the movable jaw at one end of their paths of travel.

3. A nut cracker comprising a frame; a stationary jaw on said frame; a jaw carried by the frame for movement toward and away from said stationary jaw; at least one arm swingably mounted on the frame and pivotally joined with said movable jaw; and a toothed gear, and rack assembly interconnecting the arm and the frame for imparting continued swinging movement to the arm in a direction to move the movable jaw toward the stationary jaw after a nut to be cracked has been placed in a supported position between the jaws, the gear of said assembly having a portion only thereof provided with teeth, said portion being movable to and from a position in mesh with the rack whereby the arm is rendered freely swingable when said gear portion is out of mesh with the rack.

HENRY A. BRECHEISEN.

REFERENCES CITED

The following references are of record in the file of this patent:

UNITED STATES PATENTS

| Number | Name | Date |
|---|---|---|
| 350,485 | Grove | Oct. 12, 1886 |
| 686,487 | Stickney | Nov. 12, 1901 |
| 1,437,860 | Pitman | Dec. 5, 1922 |
| 1,594,463 | Ledbetter | Aug. 3, 1926 |
| 1,665,557 | Miller | Apr. 10, 1928 |
| 1,877,642 | Brady | Sept. 13, 1932 |
| 2,157,501 | Settle | May 9, 1939 |